(12) United States Patent
Aoshima (10) Patent No.: US 6,462,645 B1
(45) Date of Patent: Oct. 8, 2002

(54) RADIO SELECTIVE CALL RECEIVER AND A METHOD OF TRANSFERRING THE RECEPTION SERVICE AREA OF A RADIO SELECTIVE CALL RECEIVER

(75) Inventor: Takashi Aoshima, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/448,614

(22) Filed: Nov. 23, 1999

(30) Foreign Application Priority Data

Nov. 27, 1998 (JP) .......................................... 10-375356

(51) Int. Cl.⁷ .............................. G08B 5/22; H04Q 1/30
(52) U.S. Cl. ...................... 340/7.2; 340/7.21; 340/7.26; 455/447
(58) Field of Search ................................ 340/7.2, 7.21, 340/7.26; 455/440, 447, 433

(56) References Cited

U.S. PATENT DOCUMENTS

| | | | |
|---|---|---|---|
| 5,257,405 A | * 10/1993 | Reitberger | 455/33.1 |
| 6,084,866 A | * 7/2000 | Dorenbosch et al. | 455/443 |
| 6,141,535 A | * 10/2000 | Ayerst | 455/3.1 |

FOREIGN PATENT DOCUMENTS

| | | |
|---|---|---|
| JP | 07162925 A | 6/1995 |
| JP | 07240952 A | 9/1995 |
| JP | 09130841 A | 5/1997 |
| JP | 09261130 A | 10/1997 |
| JP | 10210539 A | 8/1998 |

* cited by examiner

*Primary Examiner*—Donnie L. Crosland
(74) *Attorney, Agent, or Firm*—Scully, Scott, Murphy & Presser (57) ABSTRACT

A radio selective call receiver and a method of transferring reception areas only when the received frequency/area information of the transfer destination is correct and to conserve battery power. Transfer destination service area information is extracted from a radio signal of a first frequency that is being received, a second frequency corresponding to the area information is determined and the area information and the second frequency are added to an information listing means. If the radio signal including a synchronizing signal and the area information is detected at the second frequency within a time limit, the second frequency is set as the first frequency, and if the radio signal cannot be detected at the second frequency within the time limit, the second frequency and the transfer destination service area information corresponding to this second frequency that were added to the information listing means are deleted.

24 Claims, 7 Drawing Sheets

RADIO SELECTIVE CALL RECEIVER AND A METHOD OF TRANSFERRING THE RECEPTION SERVICE AREA OF A RADIO SELECTIVE CALL RECEIVER

BACKGROUND OF THE INVENTION

1. Field of the Invention

The present invention relates to a radio selective call receiver that is capable of receiving incoming calls and data over a plurality of service areas, and in particular, relates to a method of transferring the reception service area of the radio selective call receiver.

2. Description of the Related Art

In the current field of radio selective call receivers (pagers, pocket bells, etc.), service is provided in which a plurality of reception areas are registered and calls from neighboring areas are received while switching between reception areas.

Japanese Patent Laid-open No. 240952/95 and Japanese Patent Laid-open No. 162925/95 disclose examples of radio selective call receivers applied to this type of service.

The radio selective call receivers disclosed in these documents described above receive the frequency/area information of the reception area to which the radio selective call receiver is to be transferred from the present reception area in which synchronization is currently established, and the radio selective call receiver switches the receiving frequency based on the received frequency/area information.

As described above, a radio selective call receiver can therefore receive a transmitted message which is addressed to that radio selective call receiver when it has moved into the another reception area.

A transmitting station of the reception area in which a radio selective call receiver is currently established its synchronization inserts frequency information and area information relating to a new destination reception area in a call signal that is transmitted to the radio selective call receiver, and the radio selective call receiver can receive the new frequency information and area information that are transmitted from the transmitting station within the reception area.

As described above, each radio selective call receiver receives frequency and area information of the transfer destination transmitted from the transmitting station of a reception area in which synchronization is currently established and updates a frequency list, controls receiving frequency in accordance with this updated frequency list, and controls the operating power at a timing that corresponds to the transfer destination reception area.

In some cases, however, the frequency/area information of the transfer destination that is transmitted from a reception area in which synchronization is currently established is received incorrectly due to, for example, deterioration in the radio-wave conditions. Registering this type of unusable frequency/area information in the limited nonvolatile memory reduces the efficiency memory use.

In addition, successive attempts at detecting a reception area at a frequency calculated based on unusable frequency information (i.e., information that does not enable detection of a reception area) also entails a decrease in the efficiency of battery use.

SUMMARY OF THE INVENTION

It is an object of the present invention to provide a radio selective call receiver and method of transferring reception areas that allows transfer of reception areas only when the received frequency/area information of the transfer destination is legitimate and that can suppress unnecessary consumption of battery power.

To solve the above-described problems, the radio selective call receiver according to this invention is provided with: receiving means that can receive radio signals in a plurality of service areas each having a different assigned frequency; area information extracting means that extracts area information relating to a transfer destination service area from a radio signal of a first frequency that is currently being received; information listing means that allows adding and deleting of area information and assigned frequency information corresponding to each of the plurality of service areas; and timing means that provides a time limit for detection of the area information at a second frequency corresponding to the transfer destination service area.

The radio selective call receiver according to this invention is further provided with a control means that determines the second frequency that corresponds to area information relating to the transfer destination service area from among the assigned frequencies, adds to the information listing means the area information and second frequency relating to this transfer destination service area, and provisionally sets the receiving frequency of the radio signal by the receiving means to the second frequency.

In addition, the control means sets the second frequency as the first frequency in the radio selective call receiver if the area information is detected at the second frequency within the time limit.

If the control means of the radio selective call receiver cannot detect the area information at the second frequency within the time limit, the control means deletes the second frequency as well as the area information relating to the transfer destination service area that corresponds to this second frequency that were added to the information listing means.

In addition, the radio selective call receiver is provided with: holding means for temporarily holding area information relating to the transfer destination service area; and control means for determining the second frequency corresponding to area information relating to the transfer destination service area from among the assigned frequencies, holding in the holding means the second frequency and area information relating to the transfer destination service area, and provisionally setting the receiving frequency of radio signals by the receiving means to the second frequency.

If the control means of the radio selective call receiver detects the area information at the second frequency within the time limit, the control means adds this second frequency and the area information relating to the transfer destination service area that corresponds to this second frequency to the information listing means and sets this second frequency as the first frequency.

The radio selective call receiver is further provided with a synchronizing signal extracting means that extracts synchronizing signals from the radio signal, and the control means determines that the area information has been detected if synchronizing signals are extracted by the synchronizing signal extracting means.

The control means of the radio selective call receiver also determines that the signal has been detected if the area information contained in the radio signal matches any of the area information that is written in the information listing means.

According to the receiving method of transferring reception areas of the radio selective call receiver of the present invention, area information relating to a transfer destination service area is extracted from a radio signal of a first frequency that is currently being received; a second frequency corresponding to the area information is determined and the area information and second frequency are added to an information listing means; the second frequency is set as the first frequency if the area information is detected at the second frequency within a time limit; and the second frequency and the area information relating to the transfer destination service area that corresponds to this second frequency that were added to the information listing means are deleted if a area information cannot be detected at the second frequency within the time limit.

In addition, area information relating to a transfer destination service area is extracted from a radio signal of a first frequency that is currently being received; a second frequency corresponding to the area information is determined and the area information and second frequency are held in a holding means; and if the area information is detected at the second frequency within a time limit, the second frequency as well as the area information corresponding to this second frequency that are held in the holding means are added to the information listing means and further, the second frequency is set as the first frequency.

Finally, according to the method of transferring reception areas, a area information is determined to have been detected if synchronizing signals are extracted at the second frequency. A signal is also determined to have been detected if the area information contained in the radio signal matches any of the area information written in the information listing means.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
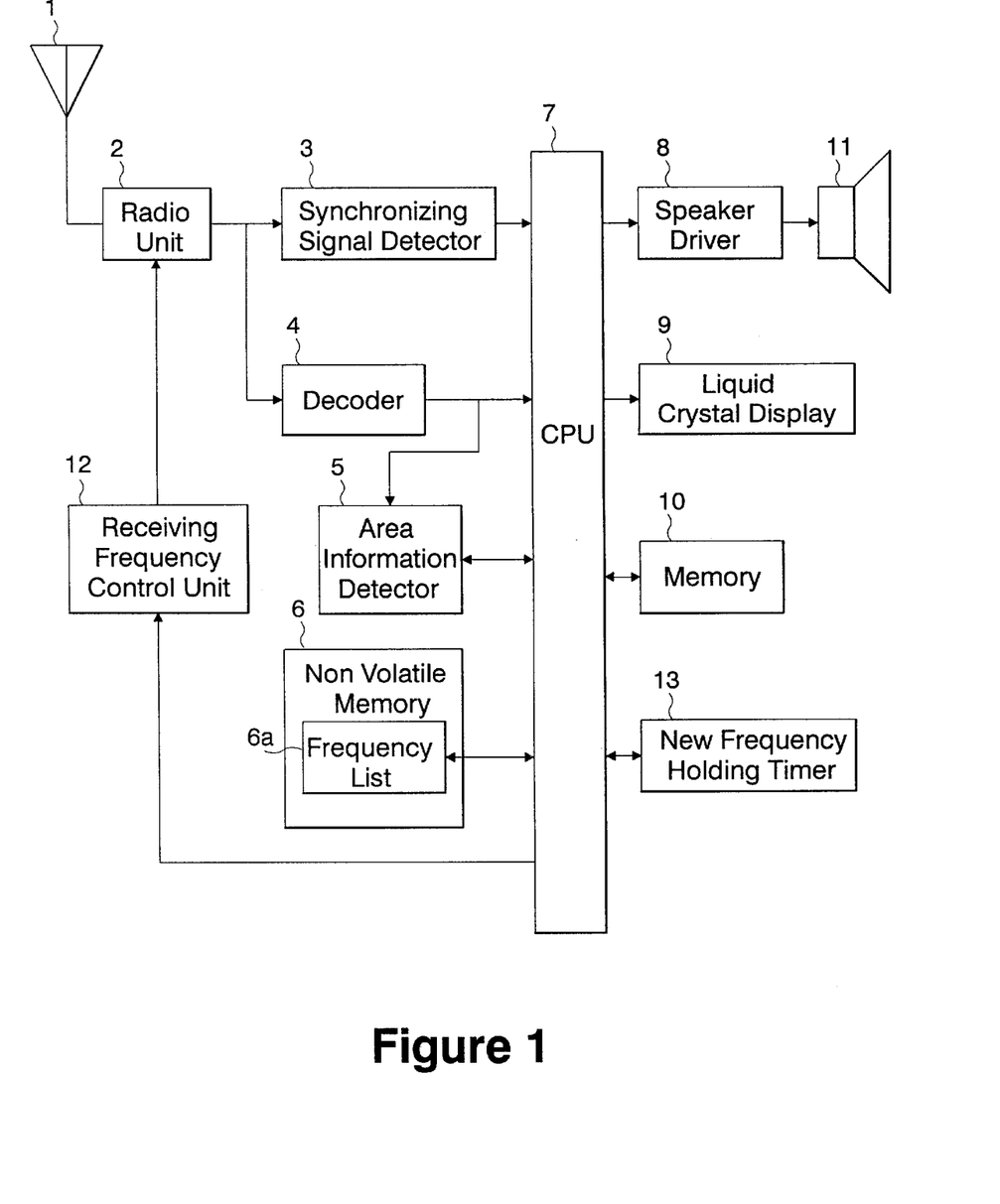
FIG. 1 is a block diagram of one embodiment of the radio selective call receiver of the present invention.

The present invention is now explained with reference to the accompanying figures. FIG. 1 is a block diagram showing the construction of a radio selective call receiver of one embodiment of the present invention.

Radio unit 2 shown in FIG. 1 receives a signal by antenna 1 and demodulates various types of information and messages addressed to subscribers that are transmitted from a transmitting station of the reception area in which synchronization is currently established and a transmitting station of the transfer destination area.

These various types of information include: area information that contains area ID (Identification) and indicates "Which reception area is transmitting the transmission wave that is currently being received?"; and frequency/area information that is inserted at the time of transferring areas into one portion of a message as an index of "The reception area for which synchronization is now to be established" by the transmitting station of the reception area for which synchronization is currently established and then transmitted to each radio selective call receiver.

Synchronizing signal detector 3 is supplied with the demodulated signals that are outputted by radio unit 2 and detects synchronizing signals from each frame.

Decoder 4 decodes the demodulated signal outputted by radio unit 2 based on synchronizing signals detected by synchronizing signal detector 3 and supplies the decoded data to CPU 7.

Memory 10 is memory such as RAM (Random Access Memory). This memory 10 temporarily holds frequency/area information that is transmitted when transferring areas and stores received messages.

Area information detector 5 extracts area information within the decoded data outputted by decoder 4, compares this area information with area information held in memory 10 or with area information stored in advance in nonvolatile memory 6, and reports judgment results to CPU 7.

New frequency holding timer 13 determines a time limit that frequency/area information can be held in memory 10.

Output devices include LCD (Liquid Crystal Display) 9 that displays received messages and speaker 11 as well as speaker driver 8 that drives speaker 11.

Receiving frequency control unit 12 controls the receiving frequency of radio unit 2 to a frequency calculated based on frequency information stored in frequency list 6a that is contained in nonvolatile memory 6.

Nonvolatile memory 6 is of a construction that allows multiple registration within frequency list 6a of frequencies that can be received by this radio selective call receiver and information relating to reception areas, and allows updating of frequency list 6a upon receiving frequency/area information due to area transfer.

New frequency holding timer 13 deletes frequency/area information held in memory 10 upon passage of a time limit which is registered in this new frequency holding timer 13. Accordingly, this part is not limited to an accurate timer that counts clock signals, and may be, for example, a device that counts nondetection time limit of synchronizing signals or that counts nondetection time limit of a new area.

Figure 2:
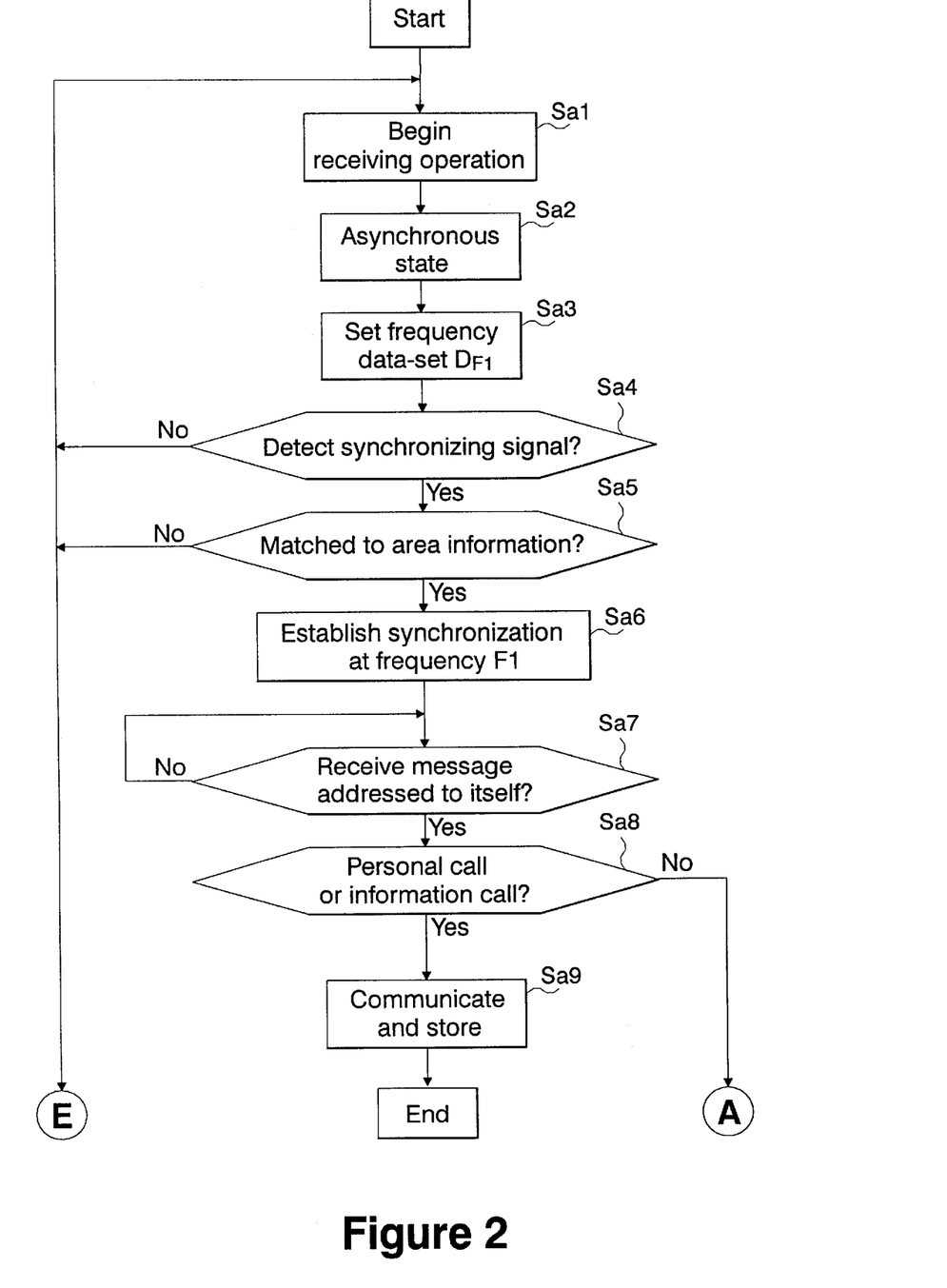
FIG. 2 shows Steps 1 through 9 of the flow chart of one embodiment of the method of transferring reception areas of a radio selective call receiver of the present invention.
Figure 3:
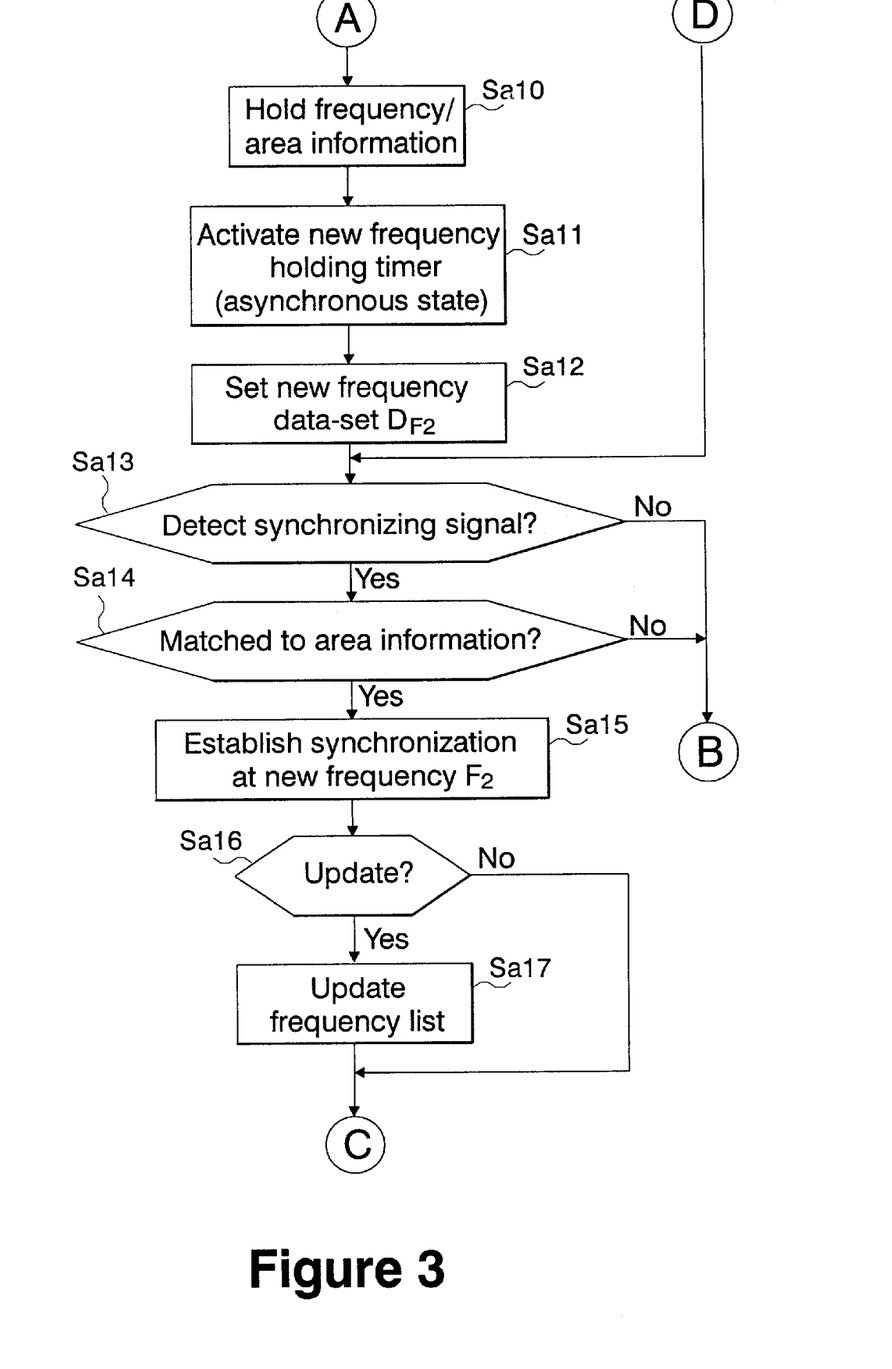
FIG. 3 shows Steps 10 through 17 of the flow chart shown in FIG. 2.
Figure 4A:
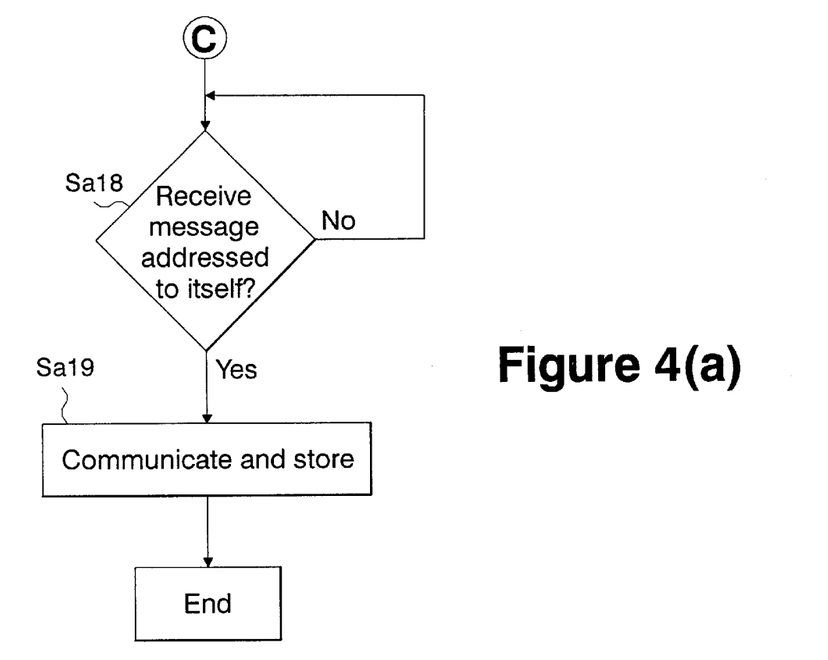
FIGS. 4a and 4b shows the flow chart of FIG. 2, with FIG. 4(a) showing Steps 18 and 19, and FIG. 4(b) showing Steps 20 and 21.
Figure 4B:
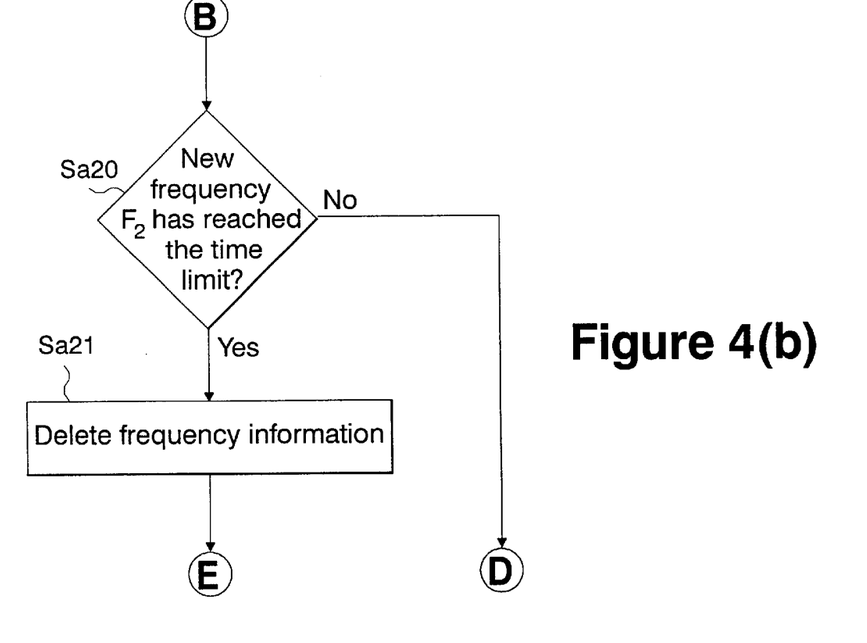

The operation of this embodiment is next explained. FIGS. 2 to 4 are flow charts showing the flow of receiving operations in this embodiment.

The radio selective call receiver begins a receiving operation (Refer Step Sa1 in FIG. 2), whereupon radio unit 2 enters an operating state, and upon receiving by antenna 1 radio communicated information from transmitting stations in each of the neighboring reception areas, demodulates this radio communicated information by a prescribed mode and supplies the demodulated signals to synchronizing signal detector 3 and decoder 4.

At this time, an asynchronous state (Step Sa2) still holds because synchronizing signals have not been detected at synchronizing signal detector 3.

CPU 7 calculates the frequency to receive based on frequency information stored in frequency list 6a in nonvolatile memory 6 and transfers the result to receiving frequency control unit 12.

Receiving frequency control unit 12 instructs the reception operating frequency to radio unit 2, but sets frequency data-set $D_{F1}$ of frequency F1 that was registered in advance in nonvolatile memory 6 (Step Sa3).

After the operating frequency has been set in radio unit 2, synchronizing signal detector 3 detects synchronizing signals from each frame of demodulated signals received from radio unit 2 and supplies these synchronizing signals to CPU 7. It is determined at this time whether or not synchronizing signals can be detected (Step Sa4), and the process moves to Step Sa1 when detection is not possible.

Area information detector 5, on the other hand, detects area information from decoded data outputted by decoder 4, compares to determine whether this area information matches area information that was stored in advance in frequency list 6a in nonvolatile memory 6 (Step Sa5), and moves to the process of Step Sa1 if the information does not match.

In this embodiment, synchronization is thus established at frequency F1 when matching is determined by area information detector 5 (Step Sa6).

Decoder 4 decodes the demodulated signals received from radio unit 2 and supplies the decoded data to CPU 7. CPU 7 then determines whether or not decoder 4 has received messages addressed to itself i.e., decoder 4 (Step Sa7) based on the synchronizing signals supplied from synchronizing signal detector 3, and remains in standby until reception.

Messages received at decoder 4 that are addressed to itself i.e., decoder 4 can be broadly divided into the three categories: personal calls, information calls, and frequency/area information that is transmitted from a transmitting station of an area in which synchronization is currently established when transferring areas as described hereinabove.

Personal calls-are generally messages to individuals, while information calls are messages that provide various information to a plurality of radio selective call receivers. These two categories of messages are consequently of no great importance in this case.

CPU 7 determines whether or not received data determined at decoder 4 to be a message addressed to itself i.e., decoder 4 is a personal call or an information call (Step Sa8), and if the message is a personal call or an information call, both communicates the information by speaker 11 or LCD 9, and further, stores the information in nonvolatile memory 6 (Step Sa9).

If, on the other hand, the received data are determined to be neither a personal call nor an information call, i.e., if the received message addressed to itself i.e., decoder 4 is determined to be frequency/area information, CPU 7 holds the frequency/area information for transfer of reception areas in memory 10 without storing it in nonvolatile memory 6 (Refer to Step Sa10 in FIG. 3). Frequency list 6a in nonvolatile memory 6 is therefore not updated at this time.

When the frequency/area information is held in memory 10 as described hereinabove, CPU 7 immediately activates new frequency holding timer 13 (Step Sa11). CPU 7 then calculates new frequency F2 that is now to be received based on the frequency information held in memory 10.

When CPU 7 instructs this new frequency F2 to receiving frequency control unit 12, receiving frequency control unit 12 sets new frequency data $D_{F2}$ in radio unit 2 (Step Sa12).

After the operating frequency is set in radio unit 2, synchronizing signal detector 3 detects synchronizing signals from each frame of the demodulated signal received from radio unit 2 and supplies the detected synchronizing signals to CPU 7. It is then determined whether or not synchronizing signals are detected (Step Sa13), and the process moves to Step Sa20 to be described hereinbelow when synchronizing signals are not detected.

Area information detector 5, on the other hand, detects area information from the decoded data outputted by decoder 4, compares this area information for matching with area information that has been stored in advance in frequency list 6a in nonvolatile memory 6 (Step Sa14), the process moving to Step Sa20, to be described hereinbelow, if there is no match.

In this embodiment, synchronization is thus established at frequency F2 upon determination of a match by area information detector 5 (Step Sa15).

CPU 7 determines whether or not to update frequency list 6a depending on whether a "FULL" state has been reached in which additional frequency/area information cannot be stored in frequency list 6a or on whether there is a match in frequency/area information stored in frequency list 6a (Step Sa16).

The frequency list is not updated if it is determined by this judgment that there are no areas for new registration and additional new registration is not possible, or if it is determined by a determination of matching that new registration is not necessary because the same information has already been stored.

In cases not covered by these conditions, CPU 7 transfers the frequency/area information held in memory 10 to frequency list 6a in nonvolatile memory 6 and carries out updating (Step Sa17).

CPU 7 determines whether or not decoder 4 has received messages addressed to itself i.e., decoder 4 based on synchronizing signals supplied from synchronizing signal detector 3 (refer to Step Sa18 in FIG. 4(a)), and if a message has been received, both communicates the information from speaker 11 or LCD 9 and stores the information in nonvolatile-memory 6 (Step Sa19).

If CPU 7 fails to detect synchronizing signals from each frame of the demodulated signal received from radio unit 2 in the above-described Step Sa13, and if area information detected from decoded data outputted by decoder 4 does not match area information stored in advance in frequency list 6a within nonvolatile memory 6 in Step Sa14, CPU 7 takes in the output of new frequency holding timer 13 and verifies whether or not detection at new frequency F2 has reached the time limit (Step Sa20).

If detection at new frequency F2 has not reached the time limit, CPU 7 returns to the process of Step Sa13 (refer to FIG. 3) and repeats detection at new frequency F2, but if detection at new frequency F2 has reached the time limit, CPU 7 deletes the frequency/area information held in memory 10 (Step Sa21) and returns to the process of Step Sa1 (refer to FIG. 2).

Another embodiment of the present invention is next explained. This embodiment also applies to the construction shown in FIG. 1, and FIGS. 5 through 7 are flow charts that show the succession of other receiving operations in this embodiment.

This radio selective call receiver begins receiving operations (refer to Step Sb1 in FIG. 5), radio unit 2 enters an operating state, and when radio signal is received from a transmitting station of any of the neighboring reception areas by antenna 1, this radio signal is demodulated according to a prescribed mode and supplied to synchronizing signal detector 3 and decoder 4.

Figure 5:
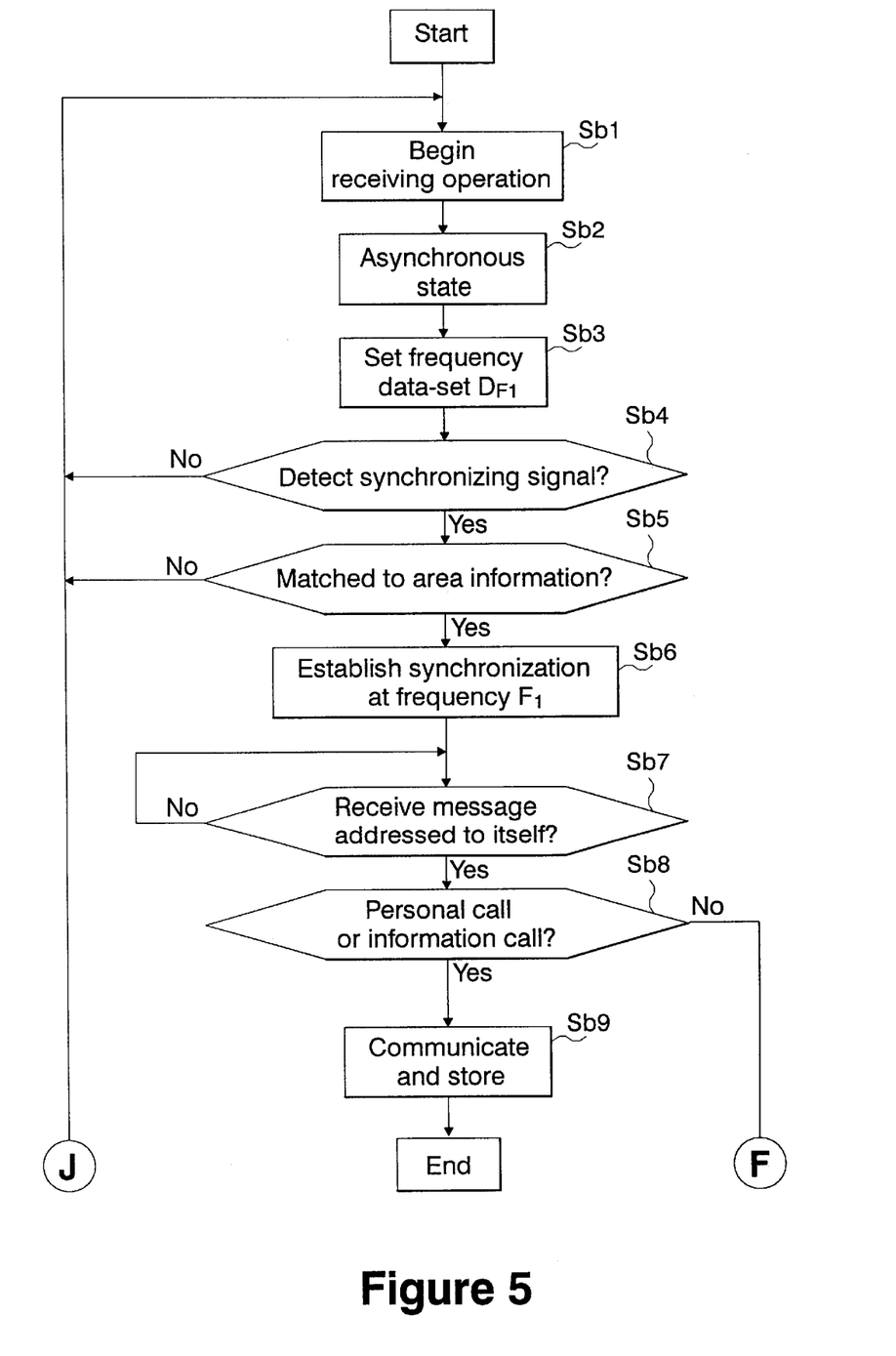
FIG. 5 shows Steps 1 through 9 of the flow chart of another embodiment of the method of transferring reception areas of a radio selective call receiver of the present invention.

Synchronizing signals are still not detected at synchronizing signal detector 3 at this time, and an asynchronous state therefore still holds (Step Sb2).

CPU 7 calculates the frequency that is now to be received based on frequency information stored in frequency list 6*a* in nonvolatile memory 6, and transfers this calculated frequency to receiving frequency control unit 12.

Receiving frequency control unit 12 instructs the receiving operating frequency to radio unit 2, and at this point, the frequency data-set $D_{F1}$ of frequency F1 that was registered in advance in nonvolatile memory 6 is set (Step Sb3).

After the operating frequency has been set in radio unit 2, synchronizing signal detector 3 detects synchronizing signals from each frame of the demodulated signal received from radio unit 2 and supplies these signals to CPU 7. It is then determined whether or not synchronizing signals can be detected (Step Sb4), and the process moves to Step Sb1 if detection is not possible.

Area information detector 5, on the other hand, detects area information from decoded data outputted by decoder 4, compares this area information for matches with area information that has been stored in advance in frequency list 6*a* in nonvolatile memory 6 (Step Sb5), and moves on to the process of Step Sb1 if there is no match.

In this embodiment, synchronization is thus established at frequency F1 (Step Sb6) upon determination of a match by area information detector 5.

Decoder 4 decodes the demodulated signal received from radio unit 2 and supplies the decoded data to CPU 7. CPU 7 then determines whether or not decoder 4 has received a message addressed to itself i.e., decoder 4 based on synchronizing signals supplied from synchronizing signal detector 3 (Step Sb7) and remains on standby until reception.

Messages addressed to decoder 4 that are received at decoder 4 can be broadly divided into the three categories of personal calls, information calls, and frequency/area information that is transmitted from a transmitting station of the area in which synchronization is currently established at the time of transferring areas described hereinabove.

A personal call is a general message for an individual, and an information call is a message providing various categories of information to a plurality of radio selective call receivers. These two types of messages are therefore of no importance here.

CPU 7 determines whether or not the received data determined at decoder 4 to be a message addressed to itself i.e., decoder 4 is a personal call or an information call (Step Sb8), and if the message is a personal call or an information call, both reports the information from speaker 11 or LCD 9 and stores the information in nonvolatile memory 6 (Step Sb9).

Figure 6:
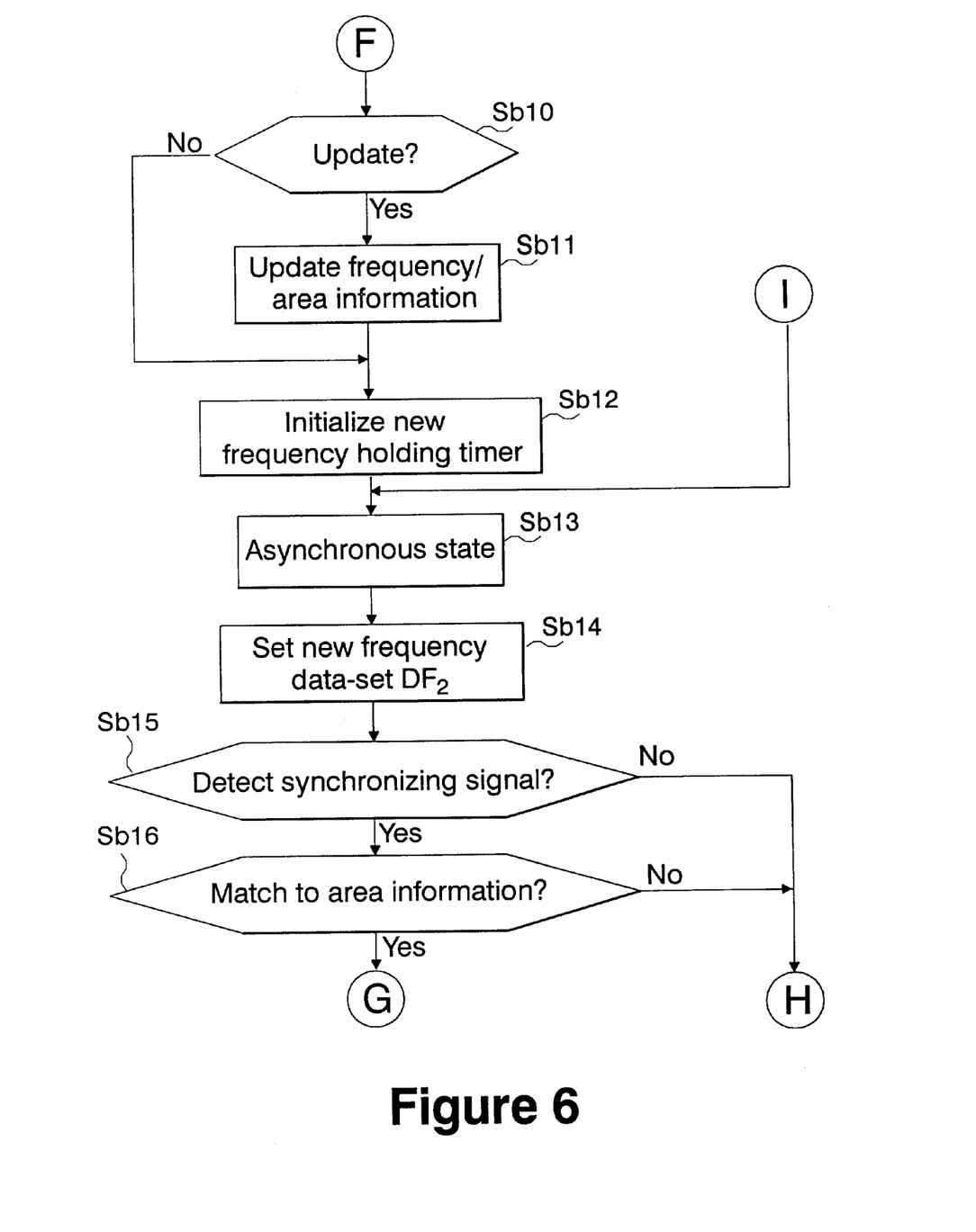
FIG. 6 shows Steps 10 through 16 of the flow chart shown in FIG. 5.

If, on the other hand, the received data are determined to be neither a personal call nor an information call, i.e., if the received message addressed to decoder 4 is determined to be frequency/area information, CPU 7 determines whether or not to update frequency list 6*a* by determining whether or not frequency list 6*a* is in a "FULL" state that does not admit storage of additional frequency/area information or by determining if there is a match with frequency/area information stored in frequency list 6*a* (refer to Step Sb10 in FIG. 6).

Updating of the frequency list is not carried out if it is determined by this determination that there are no areas for new registration and that additional new registration is not possible or if it is determined by judgment of matching that the same information has already been stored and new registration is therefore not necessary.

If none of these conditions holds, CPU 7 transfers the received frequency/area information to frequency list 6*a* in nonvolatile memory 6 and updates frequency list 6*a* (Step Sb11).

After storing the received frequency/area information for area transfer in frequency list 6*a* in nonvolatile memory 6 (Step Sb11), CPU 7 initializes new frequency holding timer 13 (Step Sb12), and this results in an asynchronous state (Step Sb13) because synchronizing signals have still not been detected in synchronizing signal detector 3.

CPU 7 further calculates new frequency F2 to receive based on frequency information stored in frequency list 6*a*, instructs new frequency F2 to receiving frequency control unit 12, whereupon receiving frequency control unit 12 sets new frequency data $D_{F2}$ in radio unit 2 (Step Sb14).

After the operating frequency has been set in radio unit 2, synchronizing signal detector 3 detects synchronizing signals from each frame of demodulated signals received from radio unit 2 and supplies the detected synchronizing signals to CPU 7. It is then determined whether or not synchronizing signals can be detected (Step Sb15), and if detection is not possible, the process moves to Step Sb20, to be described hereinbelow.

Area information detector 5 detects area information from the decoded data outputted by decoder 4, compares this area information for matching with area information stored in advance in frequency list 6*a* in nonvolatile memory 6 (Step Sb16), and if there is no matching, the process moves on to Step Sb20, to be described hereinbelow.

Figure 7A:
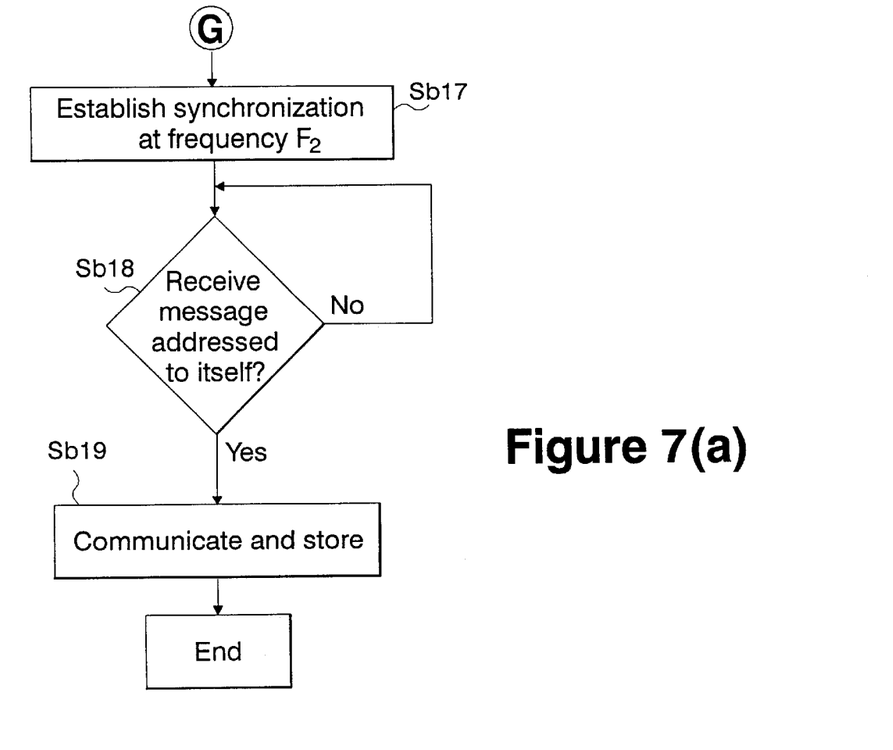
FIGS. 7a and 7b shows the flow charts of FIG. 5, FIG. 7(a) showing Steps 17 through 19 and FIG. 7(b) showing Steps 20 and 21.

In this embodiment, synchronization is thus established at frequency F2 upon determination of matching by area information detector 5 (Step Sb17 in FIG. 7(*a*)).

Decoder 4 decodes the demodulated signals received from radio unit 2 and supplies the decoded data to CPU 7. CPU 7 then determines based on synchronizing signals supplied from synchronizing signal detector 3 whether or not decoder 4 has received messages addressed to itself i.e., decoder 4 (Step Sb18), remains in a standby state until reception, and when a message is received, both reports the message from speaker 11 or LCD 9 and stores the message in nonvolatile memory 6 (Step Sb19).

Figure 7B:
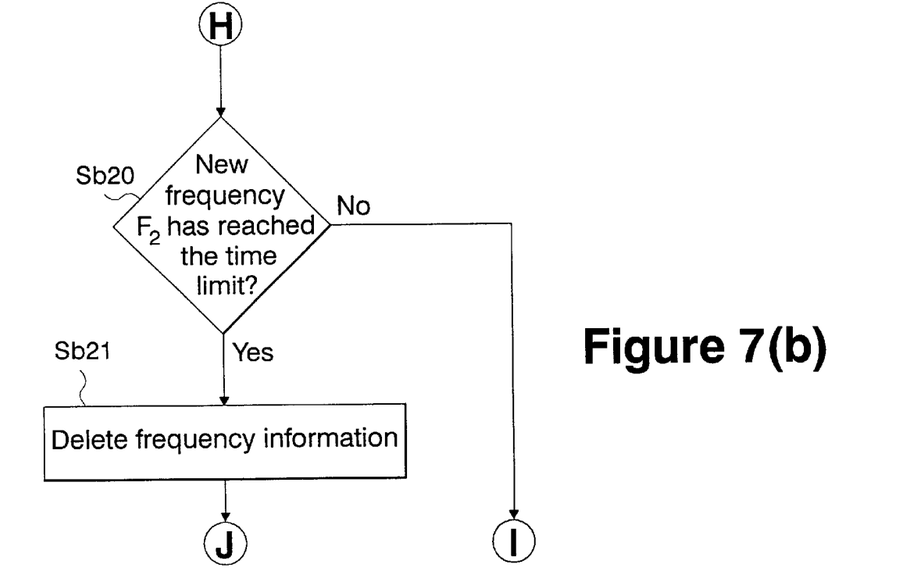

If, however, CPU 7 cannot detect synchronizing signals from each frame of demodulated signal received from radio unit 2 in the above-described Step Sb15, and if area information detected from the decoded data outputted by decoder 4 in Step SB16 does not match area information stored in advance in frequency list 6*a* in nonvolatile memory 6, CPU 7 takes in the output of new frequency holding timer 13 and verifies whether or not detection at the new frequency F2 has reached the time limit (Step Sb20).

If detection at new frequency F2 has not reached the time limit, CPU 7 then returns to the process of Step Sb13 (refer to FIG. 6), and repeats detection at new frequency F2. If detection at new frequency F2 has reached the time limit, CPU 7 deletes the frequency/area information that was stored in Step Sb11 from frequency list 6*a* in nonvolatile memory 6 (Step Sb21) and returns to the process of Step Sb1 (refer to FIG. 5).

As described in the foregoing explanation, according to the present invention, area information relating to the transfer destination service area is extracted from a area information of the first frequency that is currently being received; a second frequency that corresponds to the area information is determined and the area information and second frequency are added to an information listing means; if a signal is detected at the second frequency within a time limit, the second frequency is set as the first frequency, but if a signal cannot be detected at the second frequency within the time limit, the second frequency along with the area information relating to the transfer destination service area that corresponds to this second frequency that were added to the information listing means are deleted. In addition, area information relating to a transfer destination service area is extracted from a area information of the first frequency that is currently being received; a second frequency that corresponds to the area information is determined and the area information and second frequency are held in a holding means; and if a signal is detected at the second frequency within the time limit, the second frequency along with the area information that corresponds to this second frequency that were held in the holding means are added to the information listing means and the second frequency is set as the first frequency. In addition, it is determined that a signal has been detected if synchronizing signals are extracted at the second frequency. Further, it is determined that a signal has been detected if the area information contained in the radio signal matches with any area information written in advance in the information listing means. As a result, the present invention has the merit of realizing a radio selective call receiver and reception area transfer method that are capable of transferring reception areas only if the received frequency/area information of the transfer destination are correct, and that can suppress needless consumption of battery power.

Thus, when the radio selective call receiver of the present invention moves into a new area while the radio unit is operated by controlling the receiving frequency control unit based on the received frequency information of the new area, the determination of whether or not the new frequency/area information has been correctly acquired can be properly judged according to the judgment results of an area information detector, thereby can be avoiding the addition to the limited nonvolatile memory of frequency/area information that is unusable due to, for example, faulty reception caused by deterioration in reception conditions.

Furthermore, the present invention has the merit of eliminating the possibility of a continuous search for a new area semipermanently registered by an unusable frequency, and as a result, prevents deterioration in battery efficiency.

While preferred embodiments of the present invention have been described using specific terms, such description is for illustrative purposes only, and it is to be understood that changes and variations may be made without departing from the spirit or scope of the following claims.

What is claimed is:

1. A radio selective call receiver comprising:
   receiving means that can receive radio signals in a plurality of service areas each having a different assigned frequency;
   area information extracting means for extracting area information relating to a transfer destination service area from a radio signal including a synchronizing signal and an area information of a first frequency that is currently being received;
   information listing means that is capable of adding and deleting said area information and said assigned frequency information corresponding to each of said plurality of service areas; and
   timing means that provides a time limit for detection of said radio signal at a second frequency that is used in said transfer destination service area.

2. A radio selective call receiver according to claim 1, further comprising a control means that determines said second frequency that corresponds to area information relating to said transfer destination service area from among said assigned frequencies, adds to said information listing means the area information and second frequency relating to this transfer destination service area, and provisionally sets the receiving frequency of said radio signals by said receiving means to the second frequency.

3. A radio selective call receiver according to claim 2 wherein said control means sets the second frequency as said first frequency if said area information is detected at said second frequency within said time limit.

4. A radio selective call receiver according to claim 2 wherein said control means deletes said second frequency as well as area information relating to the transfer destination service area that corresponds to said second frequency that were added to said information listing means if said area information cannot be detected at said second frequency within said time limit.

5. A radio selective call receiver according to claim 1, further comprising:
   holding means for temporarily holding area information relating to said transfer destination service area; and
   control means for determining said second frequency corresponding to area information relating to said transfer destination service area from among said assigned frequencies, holding in said holding means the second frequency and area information relating to the transfer destination service area, and provisionally setting the receiving frequency of said radio signals by said receiving means to this second frequency.

6. A radio selective call receiver according to claim 5 wherein said control means adds said second frequency and area information relating to the transfer destination service area that corresponds to said second frequency to said information listing means and sets said second frequency as said first frequency if said control means detects said radio signal at said second frequency within said time limit.

7. A radio selective call receiver according to claim 2 further comprising a synchronizing signal extracting means that extracts synchronizing signals from said radio signal;
   and wherein said control means determines that said radio signal has been detected if said synchronizing signals are extracted by said synchronizing signal extracting means.

8. A radio selective call receiver according to claim 3 further comprising a synchronizing signal extracting means that extracts synchronizing signals from said radio signal;
   and wherein said control means determines that said radio signal has been detected if said synchronizing signals are extracted by said synchronizing signal extracting means.

9. A radio selective call receiver according to claim 4 further comprising a synchronizing signal extracting means that extracts synchronizing signals from said radio signal;
   and wherein said control means determines that said radio signal has been detected if said synchronizing signals are extracted by said synchronizing signal extracting means.

10. A radio selective call receiver according to claim 5 further comprising a synchronizing signal extracting means that extracts synchronizing signals from said radio signal;

and wherein said control means determines that said radio signal has been detected if said synchronizing signals are extracted by said synchronizing signal extracting means.

11. A radio selective call receiver according to claim 6 further comprising a synchronizing signal extracting means that extracts synchronizing signals from said radio signal;

and wherein said control means determines that said radio signal has been detected if said synchronizing signals are extracted by said synchronizing signal extracting means.

12. A radio selective call receiver according to claim 2 wherein said control means determines that said radio signal has been detected if area information contained in said radio signal matches any of the area information that is written in said information listing means.

13. A radio selective call receiver according to claim 3 wherein said control means determines that said radio signal has been detected if area information contained in said radio signal matches any of the area information that is written in said information listing means.

14. A radio selective call receiver according to claim 4 wherein said control means determines that said radio signal has been detected if area information contained in said radio signal matches any of the area information that is written in said information listing means.

15. A radio selective call receiver according to claim 5 wherein said control means determines that said radio signal has been detected if area information contained in said radio signal matches any of the area information that is written in said information listing means.

16. A radio selective call receiver according to claim 6 wherein said control means determines that said radio signal has been detected if area information contained in said radio signal matches any of the area information that is written in said information listing means.

17. A radio selective call receiver according to claim 7 wherein said control means determines that said radio signal has been detected if area information contained in said radio signal matches any of the area information that is written in said information listing means.

18. A method of transferring reception areas, comprising the steps of:

extracting area information relating to a transfer destination service area from a radio signal including a synchronizing signal and an area information of a first frequency that is currently being received;

determining a second frequency corresponding to said area information and adding the area information and second frequency to an information listing means;

setting said second frequency as said first frequency if said radio signal is detected at said second frequency within a time limit; and deleting said second frequency as well as the area information relating to the transfer destination service area that corresponds to said second frequency that were added to said information listing means if said radio signal cannot be detected at said second frequency within said time limit.

19. A method of transferring reception areas according to claim 18 wherein said radio signal is determined to have been detected if synchronizing signals are extracted at said second frequency.

20. A method of transferring reception areas according to claim 18 wherein said radio signal is determined to have been detected if area information contained in said radio signal matches any of area information written in said information listing means.

21. A method of transferring reception areas according to claim 19 wherein said radio signal is determined to have been detected if area information contained in said radio signal matches any of area information written in said information listing means.

22. A method of transferring reception areas, comprising the steps of:

extracting area information relating to a transfer destination service area from a radio signal including a synchronizing signal and an area information of a first frequency that is currently being received;

determining a second frequency that corresponds to said area information and holding said area information and second frequency in a holding means; and adding the second frequency as well as area information that corresponds to said second frequency that are held in said holding means to said information listing means if said radio signal is detected at said second frequency within a time limit, and further, setting this second frequency as said first frequency.

23. A method of transferring reception areas according to claim 22 wherein said radio signal is determined to have been detected if synchronizing signals are extracted at said second frequency.

24. A method of transferring reception areas according to claim 22 wherein said radio signal is determined to have been detected if area information contained in said radio signal matches any of area information written in said information listing means.

* * * * *